(12) United States Patent
Yates (10) Patent No.: US 10,093,393 B2
(45) Date of Patent: Oct. 9, 2018

(54) CLEAT

(71) Applicant: Yaxley Yachts Limited, Edinburgh (GB)

(72) Inventor: Alexander Thomas David Yates, Edinburgh (GB)

(73) Assignee: Yaxley Yachts Limited, Edinburgh (GB)

( * ) Notice: Subject to any disclaimer, the term of this patent is extended or adjusted under 35 U.S.C. 154(b) by 0 days.

(21) Appl. No.: 15/419,314

(22) Filed: Jan. 30, 2017

(65) Prior Publication Data

US 2017/0217546 A1    Aug. 3, 2017

(30) Foreign Application Priority Data

Feb. 1, 2016  (GB) .................................. 1601742.8
Aug. 26, 2016  (GB) .................................. 1614559.1

(51) Int. Cl.
*B63B 21/04* (2006.01)
*B63B 21/08* (2006.01)
*F16G 11/10* (2006.01)

(52) U.S. Cl.
CPC .............. *B63B 21/08* (2013.01); *F16G 11/10* (2013.01); *F16G 11/106* (2013.01)

(58) Field of Classification Search
CPC ........ B63B 21/08; F16G 11/10; F16G 11/106; B63H 21/08

USPC ......................................................... 114/218
See application file for complete search history.

(56) References Cited

U.S. PATENT DOCUMENTS 3,730,129 A * 5/1973 Helms .................... B63B 21/08
114/218
3,765,061 A 10/1973 Nash
3,812,811 A * 5/1974 Rodriguez .............. B63B 21/08
114/218

FOREIGN PATENT DOCUMENTS

FR         2904601 A1    2/2008
GB         2026080 A     1/1980
GB         2518388 A     3/2015

* cited by examiner

*Primary Examiner* — Stephen P Avila
(74) *Attorney, Agent, or Firm* — Howson & Howson LLP (57) ABSTRACT

A cleat includes two cams (36) comprising mutually opposed convex surfaces rotatable about parallel axes which extend vertically in a rope-trapping position of the cleat, to bring the arcuate surfaces together and apart. The cams (36) are urged towards each other to trap a rope (66) therebetween. Each cam is also mounted to a horizontal cylinder (2) for rotation about an axis of the cylinder, in order to allow the rope (66) to rotate the arcuate surfaces by pulling in a line above this horizontal axis and to free the rope.

16 Claims, 7 Drawing Sheets

CLEAT

BACKGROUND TO THE INVENTION

This invention relates to a cleat.

A known cam cleat for use on a sailing boat comprises two opposed spring-loaded rotatable cams defining a passage for a rope. The cams have knurled arcuate opposed surfaces that are brought together to trap the rope when it is pulled in the direction in which the gap between the cams widens.

In order to release the rope it is necessary firstly to ease the tension by pulling the rope in the opposite direction to that in which its motion is restrained, and then flick the rope upwards. This can be extremely difficult when the rope is under a large load or when the operator is at the incorrect angle to the cleat, e.g. leaning out of the boat for balance or far away from the cleat.

U.S. Pat. No. 3,765,061 attempts to address this problem by providing a lever protruding below the cams, which lever moves the cams apart when depressed by the rope. This is useful when the taut part of the rope is to be lengthened. However, due to the fact that the rope must extend at a downward angle from the cleat to depress the lever, this arrangement is of no use when the rope is to be released entirely from the cleat.

SUMMARY OF THE INVENTION

The present invention provides a cleat including two cams comprising mutually opposed convex surfaces rotatable about parallel axes which extend vertically in a rope-trapping position of the cleat, to bring the arcuate surfaces together and apart, the cams being urged towards each other to trap a rope therebetween, each cam also being mounted to a horizontal cylinder for rotation about a horizontal axis of the cylinder in order to allow the rope to rotate the arcuate surfaces by pulling in a line above this horizontal axis and to free the rope. In other words, this horizontal axis of rotation is below the line of action of the tension in the rope.

The cleat may include an arm, such as a lever arm rotatable about said horizontal axis, comprising an eyelet arranged to have the rope fed therethrough on the side where the rope is not tensed, the arm being liftable by lifting the rope in order to rotate the cams to free the rope. The lever arm may be carried on the cylinders.

The cams may be fixed to balls or cam cylinders lodged in apertures in the cylinders.

Means may be included for adjusting the height of the rope relative to the cams in the rope-trapping position to alter the line of tension in the rope relative to the axis of rotation. These may include means for adjusting the height of the eyelet relative to the axis of rotation.

Generally helical springs for urging the cams towards each other may be located around axes which extending substantially vertically in the rope-trapping position.

BRIEF DESCRIPTION OF THE DRAWINGS

The invention will now be described in more detail, by way of example only, with reference to the accompanying drawings, in which.

DETAILED DESCRIPTION OF PARTICULAR EMBODIMENTS

In cleats according to the invention, the positioning of the loaded rope below the centre of rotation holds the cams in the down/closed position until lifting the rope allows the load to move above the centre of rotation, causing the cams to rotate and release.

Figure 1:
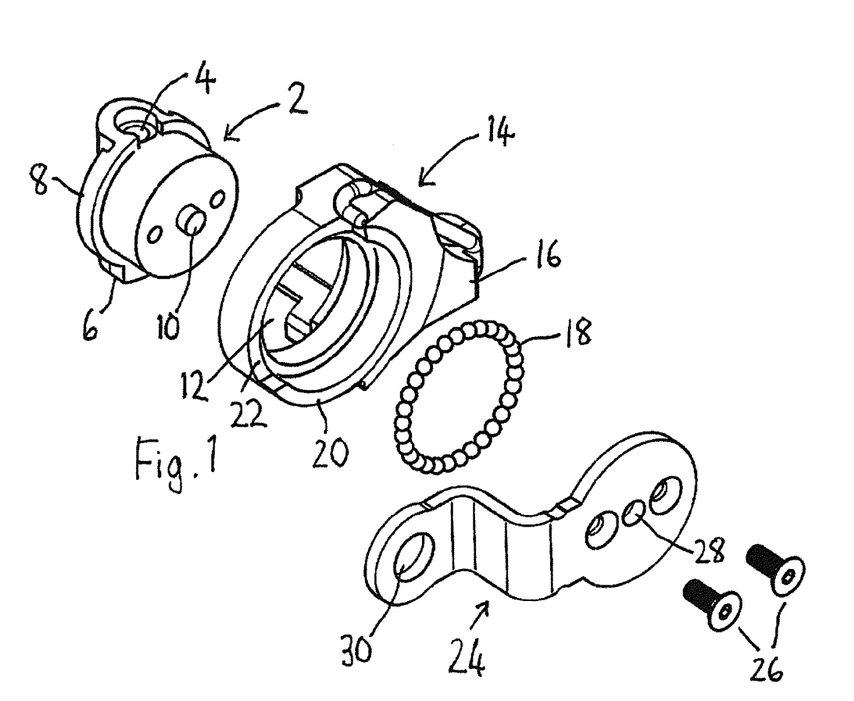
FIG. 1 is an exploded view of a cylinder and associated parts of a cleat according to an embodiment of the invention.

FIG. 1 shows components for mounting one of two cams in a cleat. A cam-mounting cylinder 2 includes upper and lower cylindrical apertures 4, 6, formed in gaps in a flange 8 on the cylinder. On its opposite face, the cylinder has a circular pin 10.

The cylinder 2 is received in a circular hole 12 in a mounting piece 14, which has a mounting extension 16, in this example of generally triangular shape, the mounting piece and mounting extension forming an integral part of a casing of the cleat. The cylinder 2 is rotatable within the mounting piece 14 by means of a ball race 18. On its outer side, the mounting piece 14 has an arcuate lip 20, defining a forward facing gap 22.

A lever arm 24 is secured to the outer end of the cylinder 2, by means of screws 26 and the engagement of the pin 10 in a hole 28 in the lever arm. The lever arm 24 sits in the gap 22 and is rotatable within the limits of the gap. The lever arm has a circular aperture 30 in its free end.

Figure 2:
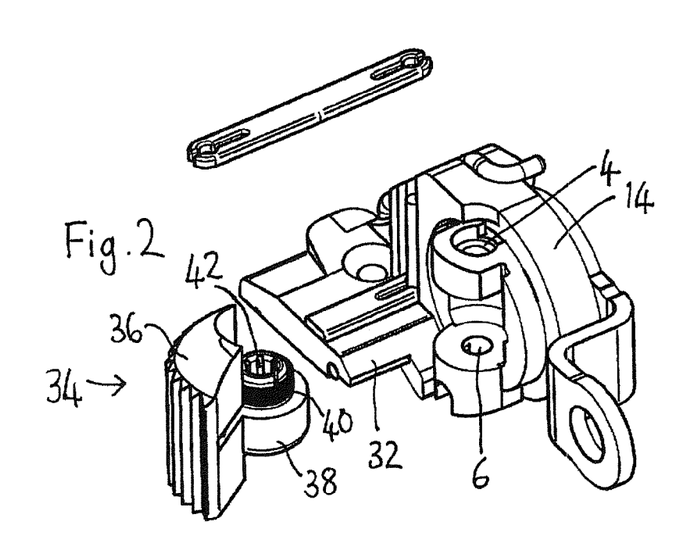
FIG. 2 shows the parts of FIG. 1 assembled, together with part of a casing and a cam.

FIG. 2 shows a further part of the casing 32, which may be formed from plastics reinforced with wire, and which comprises the mounting piece 14 and the mounting extension 16. FIG. 2 also shows a cam member 34 comprising a cam 36 having an arcuate, serrated engaging surface. The cam member includes a generally cylindrical projection 38, carrying a helical spring 40 and with a central cylindrical passage 42. The cam member is mounted to the cylinder 2 by engaging the projection 38 between the cylindrical apertures 4, 6 so that the cylindrical passage 42 is aligned therewith.

Figure 3:
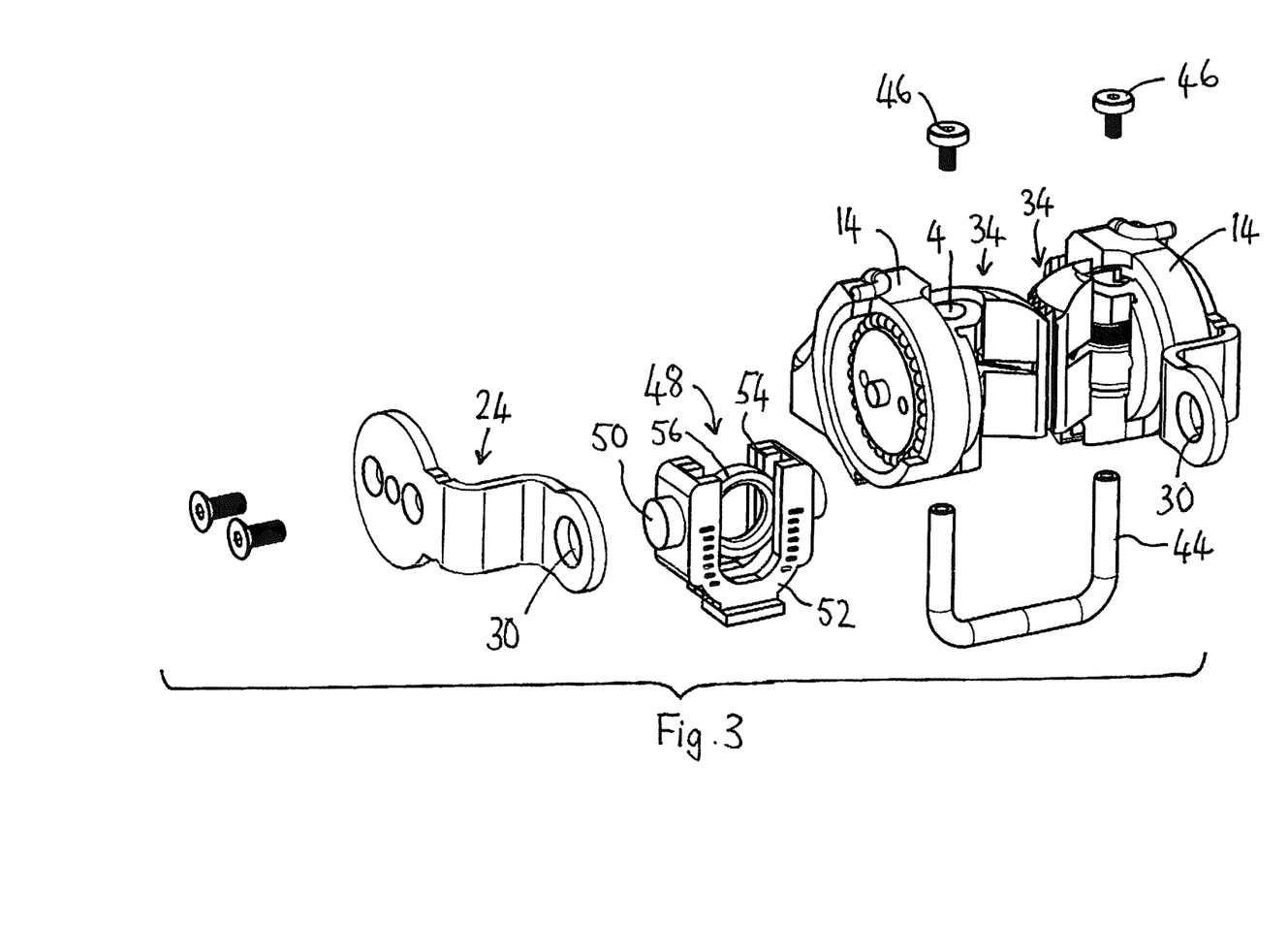
FIG. 3 is a partially exploded view of the cylinders, cams, and associated components, including parts of the casing.

FIG. 3 shows the two symmetrical cam members 34 of the cleat, mounted to their respective cylinders 2 and mounting pieces 14. The cam members 34 are fixed to the cylinders by a strong U-shaped bolt 44 which extends through the cylindrical apertures 4, 6 and the cylindrical passages 42 and, in this example, is secured by screws 46.

Figure 4:
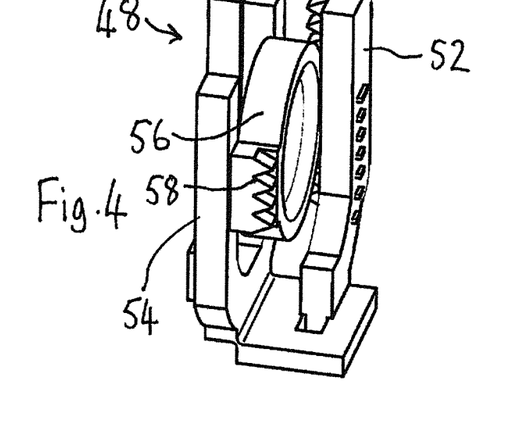
FIG. 4 shows an eyelet of the cleat.

FIGS. 3 and 4 shows a demountable loop assembly 48, which has trunnions 50 engaging in the apertures 30 of the lever arms 24. The loop assembly comprises a front part 52, a rear part 54 and an eyelet 56 sandwiched between the front and rear parts and retained by teeth 58. Eyelets of different sizes, for ropes of different thicknesses, can be provided and can be interchangeably installed in the loop assembly 48 at different heights.

Figure 5:
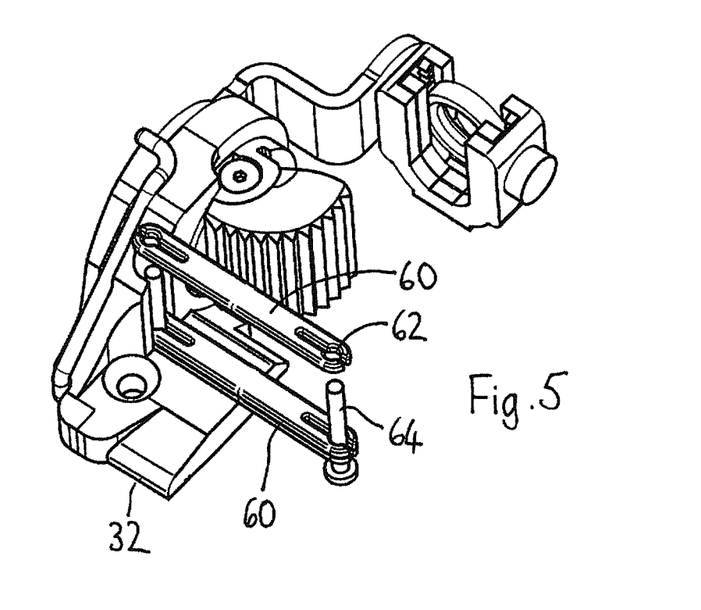
FIG. 5 is a cut-away view of the cleat showing spacer bars.

FIG. 5 is a fragmentary view showing spacer bars 60 that can be installed in a rear part of the casing 32. Apertures 62 on the spacer bars are slotted over vertical rods 64 attached to the casing. The apertures 62 have an open keyhole shape, and expand as the spacer bars are pressed on to the rods 64. Thus, the spacer bars fit tightly on the rods and will not slip off if the boat capsizes.

Figure 6:
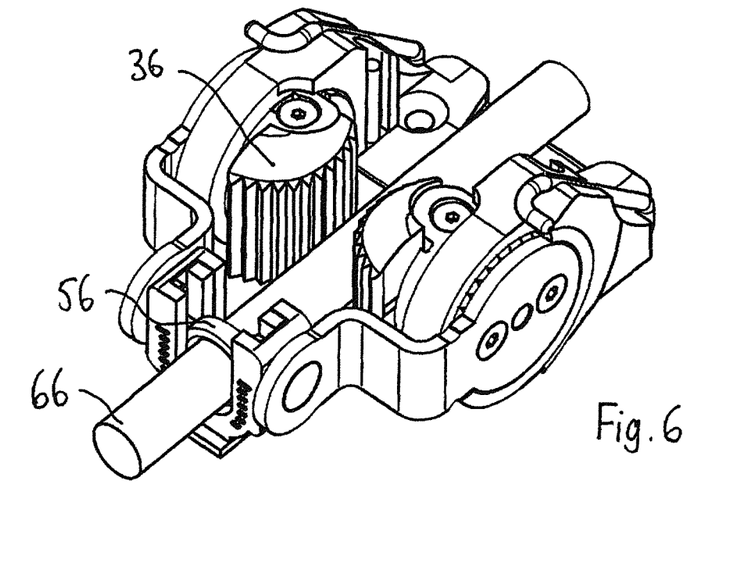
FIGS. 6 and 7 are respectively a perspective view and a cut-away side view of the assembled cleat with a trapped rope.
Figure 7:
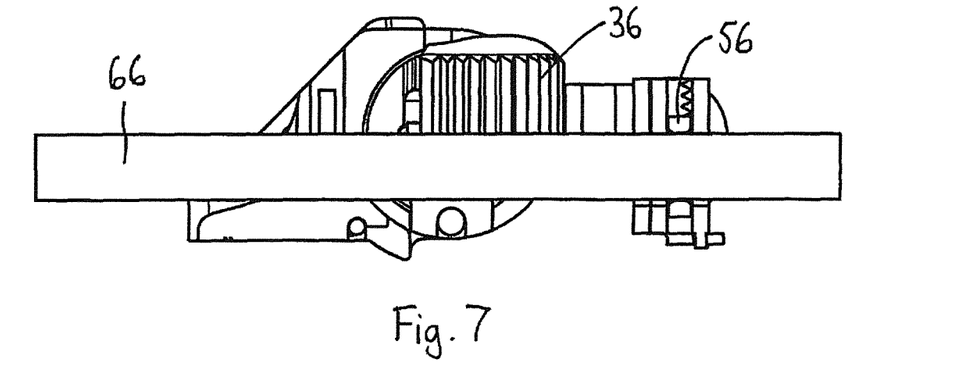

The spacer bars 60 are used to raise the rope within the cleat, if desired, to a height depending on the number of spacer bars. FIGS. 6 and 7 show how a rope 66 in the cleat without any spacer bars. The rope has been threaded between the cams 36 and through the eyelet 56. The helical springs 40 cause the cams 36 to trap the rope.

Figure 8:
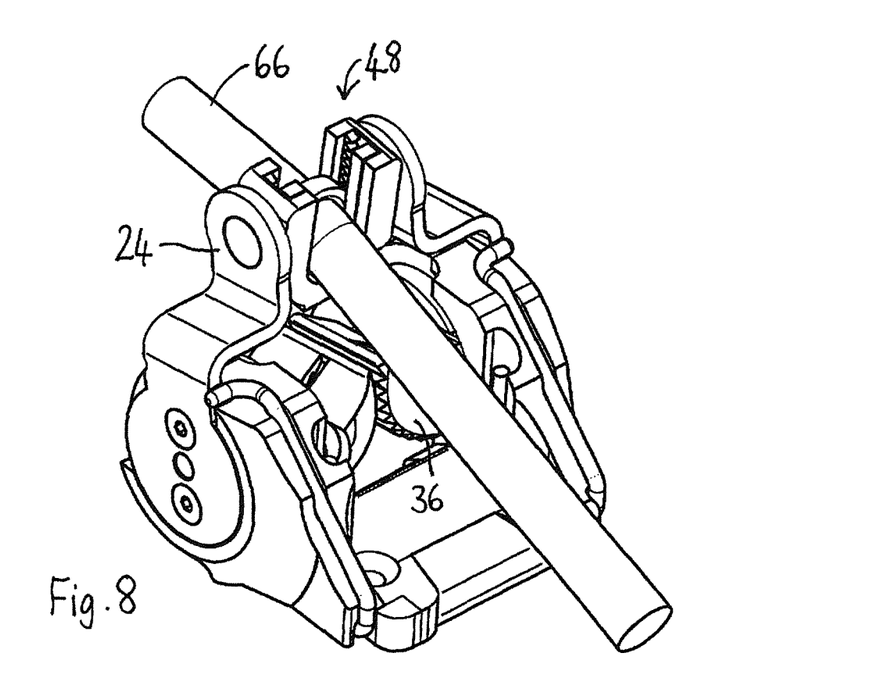
FIG. 8 shows the cleat with the rope released.

FIG. 8 shows how the rope 66 is raised to release it. Raising the rope lifts the loop assembly 48 which rotates the lever arms 24, the cylinders 2 and the cams 36. When the rope reaches a critical point, its tension acts to rotate the cams and release the rope. The lower the trapped position of the rope, set by the number of spacers bars 60 and the height of the loop assembly 48, the more the rope must be raised to reach this critical point.

Figure 9:
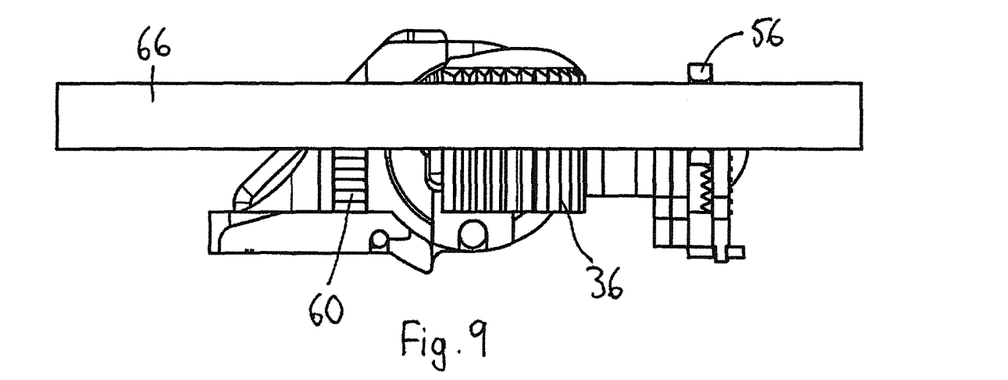
FIG. 9 is a cut-away side view of the cleat with spacer bars and a rope in a raised position.

FIG. 9 shows the rope 66 in the cleat at the highest position, with the eyelet 56 set high and with six spacer bars 60 in place. In this position the tension in the rope already acts above the horizontal axis of rotation of the cams 36. As soon as the user no longer holds the rope 66 down, it will release the cams, and allow them to swivel.

Figure 10:
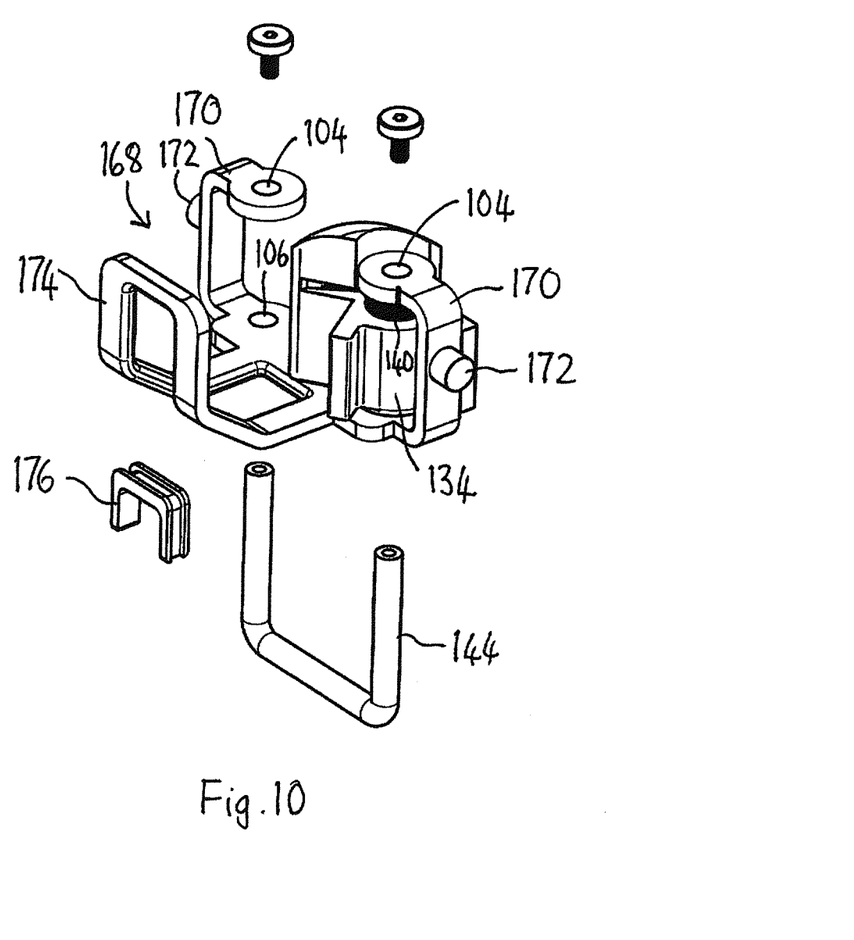
FIG. 10 is an exploded view of components of an alternative cleat, including one of the cams.
Figure 11:
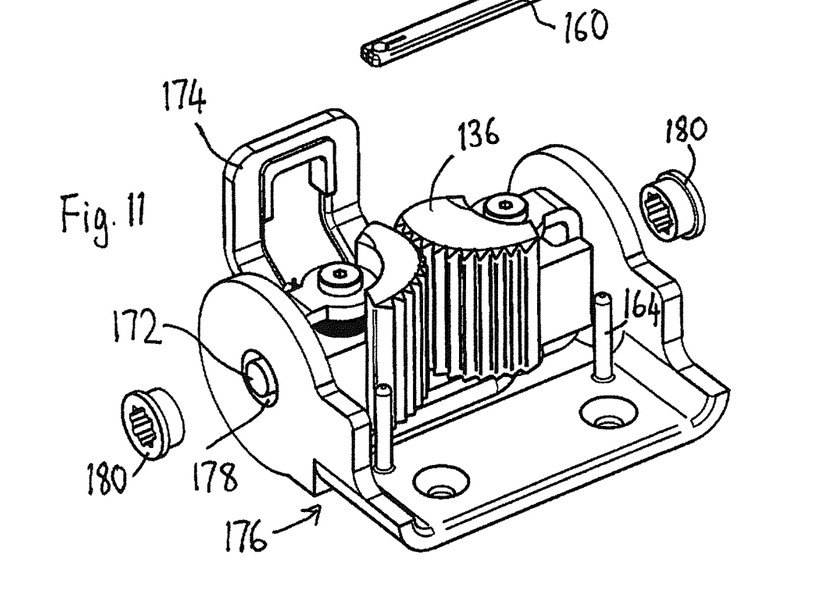
FIG. 11 is a partially exploded view of the cleat of FIG. 10.
Figure 12:
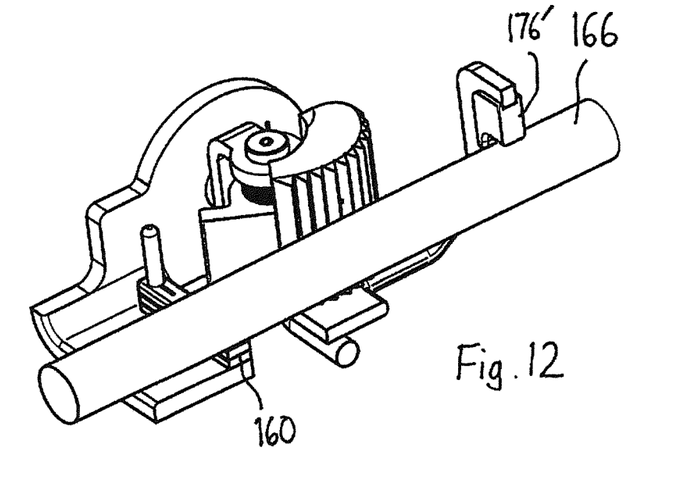
FIG. 12 is a cut-away view of the cleat of FIGS. 10 and 11, showing a trapped rope.

FIGS. 10, 11 and 12 show an alternative cleat of simpler design.

FIG. 10 is an exploded view in which one of two cam members 134 is in place in a in an inner housing 168 which is formed from folded sheet metal. The inner housing includes two cam brackets 170, one on each side, and each having upper and lower circular apertures 104, 106. The generally cylindrical cam members 34 each carry a helical spring 140. They are lodged in the apertures 104, 106 and secured there by means of a U-shaped bolt 144. Each cam bracket 170 carries a horizontal cylinder 172 on its outer side.

An upwardly-extending front part of the inner housing 168 is formed as a bottomless loop 174. An insert 176 can be lodged in the uppermost part of the loop 174. Inserts of different thicknesses can be provided, to vary the effective height of the loop 174.

As shown in FIG. 11, the inner housing 168 is seated within an outer housing 176, which can also be formed of folded sheet metal. The cylinders 172 extend through circular apertures 178 in ends of the outer housing 176, and are secured there by plugs 180 which are fixed within the apertures 178. The cylinders 172 can rotate within these plugs 180. At the rear of the outer housing are rods 164 for spacer bars 160, similar to those described with respect to FIGS. 6 to 9.

FIG. 12 is a cut-away view of the cleat showing a rope 166 trapped in the cleat. In the set-up shown here, the rope 166 is kept at an intermediate height by spacer bars 160 and an insert 176'.

Operation of this cleat is similar to that shown in FIGS. 1 to 9, but the bottomless loop 174 does not have to swivel with respect to the remainder of the inner housing 168. The size of the insert determines the amount by which the rope has to be raised before it causes the inner housing 168 and the cams 136 to swivel. The cams are then reset by pulling the rope back down between them.

The cleat of the invention ingeniously frees the rope from between the cams using the very tension that keeps the rope trapped when required.

The invention claimed is:

1. A cleat including two cams comprising mutually opposed convex surfaces rotatable about parallel axes which extend vertically in a rope-trapping position of the cleat, to bring the arcuate surfaces together and apart, the cams being urged towards each other to trap a rope therebetween, each cam also being mounted to a horizontal cylinder for rotation about an axis of the cylinder, in order to allow the rope to rotate the arcuate surfaces by pulling in a line above this horizontal axis and to free the rope, wherein the cams form part of cam members lodged in apertures in the horizontal cylinders.

2. A cleat according to claim 1, wherein the convex surfaces of the cams extend below said axis of the cylinder to grip the rope below said axis.

3. A cleat according to claim 1, including an arm carrying an eyelet arranged to have the rope fed therethrough on the side where the rope is not tensed, the arm being liftable by lifting the rope in order to rotate the cams to free the rope.

4. A cleat according to claim 3, wherein the arm comprises a lever arm rotatable about said horizontal axis.

5. A cleat according to claim 4, wherein the lever arm is carried on the cylinders.

6. A cleat according to claim 1, wherein the cam members include cam cylinders, and wherein the cams are fixed to the cam cylinders which are lodged in the apertures in the horizontal cylinders.

7. A cleat according to claim 3, wherein the height of the eyelet relative to the aim is adjustable, for adjusting the height of the rope in the rope-trapping position.

8. A cleat according to claim 1, including at least one spacer, removably positionable on an abutment surface of the cleat to raise the rope above said surface.

9. A cleat according to claim 1, wherein helical springs for urging the cams towards each other are located around axes which extend substantially vertically in the rope-trapping position.

10. A cleat according to claim 1, including a housing formed from a folded metallic sheet.

11. A cleat according to claim 10, wherein the horizontal cylinders are provided on said housing.

12. A cleat including two cams comprising mutually opposed convex surfaces rotatable about parallel axes which extend vertically in a rope-trapping position of the cleat, to bring the arcuate surfaces together and apart, the cams being urged towards each other to trap a rope therebetween, each cam also being mounted to a horizontal cylinder for rotation about an axis of the cylinder, in order to allow the rope to rotate the arcuate surfaces by pulling in a line above this horizontal axis and to free the rope, wherein the cleat includes an arm carrying an eyelet arranged to have the rope fed therethrough on the side where the rope is not tensed, the arm being liftable by lifting the rope in order to rotate the cams to free the rope.

13. A cleat according to claim 12, wherein the arm comprises a lever arm rotatable about said horizontal axis.

14. A cleat according to claim 13, wherein the lever arm is carried on the cylinders.

15. A cleat according to claim 12, wherein the height of the eyelet relative to the arm is adjustable, for adjusting the height of the rope in the rope-trapping position.

16. A cleat including two cams comprising mutually opposed convex surfaces rotatable about parallel axes which extend vertically in a rope-trapping position of the cleat, to bring the arcuate surfaces together and apart, the cams being urged towards each other to trap a rope therebetween, each cam also being mounted to a horizontal cylinder for rotation about an axis of the cylinder, in order to allow the rope to rotate the arcuate surfaces by pulling in a line above this horizontal axis and to free the rope, wherein the cleat includes at least one spacer, removably positionable on an abutment surface of the cleat to raise the rope above said surface.

* * * * *